(12) United States Patent
Gagne et al.

(10) Patent No.: US 7,585,087 B2
(45) Date of Patent: Sep. 8, 2009

(54) SENSING LIGHT FIXTURE DEVICE

(75) Inventors: Jean Gagne, St. Vaudreuil-Dorion (CA); Howard Yaphe, Ville St. Laurent (CA); Andrew Miles, Cornwall (CA)

(73) Assignee: Canlyte Inc., Lachine (CA)

( * ) Notice: Subject to any disclaimer, the term of this patent is extended or adjusted under 35 U.S.C. 154(b) by 232 days.

(21) Appl. No.: 11/619,401

(22) Filed: Jan. 3, 2007

(65) Prior Publication Data

US 2007/0164681 A1    Jul. 19, 2007

Related U.S. Application Data

(60) Provisional application No. 60/756,618, filed on Jan. 5, 2006.

(51) Int. Cl.
*F21V 23/02* (2006.01)

(52) U.S. Cl. .................. 362/221; 362/225; 362/260

(58) Field of Classification Search .......... 362/217–225
See application file for complete search history.

(56) References Cited

U.S. PATENT DOCUMENTS

| | | |
|---|---|---|
| 1,902,026 A | 3/1933 | Hall |
| 2,434,781 A | 1/1948 | Kurtzon |
| 2,455,333 A | 11/1948 | Harris |
| 2,539,974 A | 1/1951 | Riddell |
| 2,687,516 A | 8/1954 | Schneiderman |
| 2,958,763 A | 11/1960 | Bodian |
| 3,049,579 A | 8/1962 | Sulzer |
| 3,155,324 A | 11/1964 | Chen |
| 3,349,237 A | 10/1967 | Jackson |
| 3,555,267 A | 1/1971 | Sutter |
| 3,816,880 A | 6/1974 | Jacobs |
| 3,909,100 A | 9/1975 | Hodge, Jr. |
| 4,000,406 A | 12/1976 | Bhavsar |
| 4,054,790 A | 10/1977 | Slaughter |
| 4,298,918 A | 11/1981 | Metcalf, II |
| 4,323,953 A | 4/1982 | Hutchison |
| 4,407,011 A | 9/1983 | Lahm |
| 4,422,132 A | 12/1983 | Trowbridge |
| 4,494,175 A | 1/1985 | Gawad et al. |
| 4,498,126 A | 2/1985 | Hernandez |
| 4,646,212 A | 2/1987 | Florence |
| 5,008,790 A | 4/1991 | Fabbri |
| 5,177,404 A | 1/1993 | Cohen et al. |
| 5,183,327 A | 2/1993 | Fabbri |

(Continued)

*Primary Examiner*—Stephen F Husar
*Assistant Examiner*—James W Cranson
(74) *Attorney, Agent, or Firm*—John F. Salazar; Middleton Reutlinger (57) ABSTRACT

Disclosed is a light fixture device comprising an elongate housing, the housing having a pair of opposed edge faces, a first central longitudinal region and a pair of second longitudinal regions, the first longitudinal region being centrally located therebetween, the first and second longitudinal regions extending between the two edge faces, the central first longitudinal region including at least one light emitting portion, one of the second longitudinal regions including at least one sensor portion, the at least one sensor portion being positioned at a location which is optimally selected relative to a work station in a room space below the light fixture device and/or relative to one or more ambient light sources near the light fixture device, the location being one of a plurality of possible locations along a substantially continuous location line extending between the two edge faces.

12 Claims, 10 Drawing Sheets

U.S. PATENT DOCUMENTS

| | | |
|---|---|---|
| 5,371,444 A | 12/1994 | Griffin |
| 5,658,067 A | 8/1997 | Engle et al. |
| 5,716,128 A * | 2/1998 | Clark et al. ............... 362/221 |
| 5,803,589 A * | 9/1998 | Lee ............................ 362/225 |
| 6,164,797 A | 12/2000 | Crane et al. |
| 6,346,782 B1 | 2/2002 | Knoble |
| 6,422,721 B1 | 7/2002 | Plunk et al. |
| 6,582,106 B2 | 6/2003 | Jamison |
| 6,642,667 B2 | 11/2003 | Avis |
| 6,805,470 B1 | 10/2004 | Ward |
| 6,854,860 B2 | 2/2005 | Plunk |
| 6,948,831 B1 | 9/2005 | Naqvi |
| 7,080,923 B2 * | 7/2006 | Plunk et al. ............... 362/225 |
| 7,175,315 B2 | 2/2007 | Eaton |
| 2005/0201094 A1 | 9/2005 | Plunk |

* cited by examiner

SENSING LIGHT FIXTURE DEVICE

CROSS-REFERENCE TO RELATED APPLICATIONS

The entire subject matter of U.S. Provisional application Ser. No. 60/756,618 filed Jan. 5, 2006 and entitled SENSING LIGHT FIXTURE DEVICE is incorporated by reference. The applicants claim priority benefit under Title 35, United States Code, Section 119 of U.S. Provisional application Ser. No. 60/756,618 filed Jan. 5, 2006 and entitled SENSING LIGHT FIXTURE DEVICE.

STATEMENT REGARDING FEDERALLY SPONSORED RESEARCH OR DEVELOPMENT

Not applicable.

REFERENCE TO A "SEQUENTIAL LISTING," A TABLE, OR A COMPUTER PROGRAM LISTING APPENDIX SUBMITTED ON A COMPACT DISC

Not applicable.

BACKGROUND OF THE INVENTION

1. Field of the Invention

The present invention relates to light fixtures.

2. Description of the Related Art

With the ever increasing cost of energy, significant gains have been made in the development of energy efficient lighting. Work spaces improve when lighting is tailored to fit them. Energy can be saved if the light fixture can be sensitive to the presence of workers in such work spaces. However, in some cases, conventional light fixtures provide limited flexibility.

SUMMARY OF THE INVENTION

In one aspect, there is provided a light fixture device comprising an elongate housing, the housing having a pair of opposed edge faces, a first central longitudinal region and a pair of second longitudinal regions, the first longitudinal region being centrally located therebetween, the first and second longitudinal regions extending between the two edge faces, the central first longitudinal region including at least one light emitting portion, one of the second longitudinal regions including at least one sensor portion, the at least one sensor portion being positioned at a location which is optimally selected relative to a work station in a room space below the light fixture device and/or relative to one or more ambient light sources near the light fixture device, the location being one of a plurality of possible locations along a substantially continuous location line extending between the two edge faces.

An alternative embodiment further comprises a power supply positioned in one of the second longitudinal regions.

An alternative embodiment further comprises a power supply, the power supply and the sensor portion being positioned in opposite second longitudinal regions.

An alternative embodiment further comprises a power supply and communication and power supply wiring positioned in one of the second longitudinal regions, the sensor portion being positioned in the other of the second longitudinal regions.

An alternative embodiment further comprises a power supply and communication and power supply wiring positioned adjacent the at least one sensor portion in one of the second longitudinal regions.

In an alternative embodiment, the housing has a lower surface, the light emitting portion including one or more lenses, diffusers, filters, a shields and/or louvers located adjacent to or in the lower surface.

In an alternative embodiment, the housing has a lower portion and an upper portion, the upper portion including one or more openings, the light emitting portion including a light source for emitting light through one or more of the openings.

An alternative embodiment further comprises a power supply and communication and power supply wiring positioned in one of the second longitudinal regions, the at least one sensor portion including a pair of sensor portions being positioned in another of the second longitudinal regions.

In an alternative embodiment, the at least one sensor portion includes a daylight sensor, an occupancy sensor and/or an infrared remote control sensor.

An alternative embodiment further comprises a power supply and communication and power supply wiring positioned in one of the second longitudinal regions, the at least one sensor portion including a pair of sensor portions being positioned in another of the second longitudinal regions, mounting means for mounting the housing in the room space, one of the sensor portions including a daylight sensor which is at a location on the location line which is to be distal relative to an ambient light source in the room space, an occupancy sensor which at a location on the location line which is to be above the work station, and/or a remote control sensor which is at a location on the location line to be above the work station.

In another alternative aspect, there is provided a light fixture comprising a housing assembly, the housing assembly having a pair of opposed edge faces and two or more inline elongate housing portions extending therebetween, the two or more housing portions collectively providing a first set of two or more inline first longitudinal regions, the first set being located between two sets of two or more inline second longitudinal regions, the first inline longitudinal regions and second inline longitudinal regions extending between the two edge faces, the first inline longitudinal regions including at least one light emitting portion, the second inline longitudinal regions including at least one sensor portion, the at least one sensor portion being positioned at a location which is optimally selected relative to a work station in a room space below the light fixture and/or relative to one or more ambient light sources near the light fixture, the location being one of a plurality of possible locations along a substantially continuous location line extending between the two edge faces, and a pair of end cap units joined to the inline elongate housing portions.

In still another alternative aspect, there is provided a method of optimizing an operational mode of a light fixture comprising:

providing an elongate housing with a pair of opposed edge faces, a first longitudinal region located between a pair of second longitudinal regions, arranging the first longitudinal region and the second longitudinal regions to extend between the two edge faces, associating at least one light emitting portion with the first longitudinal region, providing a path on at least one of the second longitudinal regions from near one edge face to near another edge face as a plurality of possible locations for a sensor portion;

determining an installation configuration for the light fixture in room space;

determining a work space location within the room space;

determining an optimal location for a sensor portion at one of the plurality of locations, and once the optimal location is determined;

installing the sensor portion at the optimal location; and installing the light fixture in the room space.

In still another alternative aspect, there is provided a method of improving an operational mode of a light fixture comprising:

a step for providing an elongate housing with a pair of opposed edge faces, a first longitudinal region located between a pair of second longitudinal regions, a step for arranging the first longitudinal region and the second longitudinal regions to extend between the two edge faces, a step for associating at least one light emitting portion with the first longitudinal region, a step for providing a path on at least one of the second longitudinal regions from near one edge face to near another edge face as a plurality of possible locations for a sensor portion;

a step for determining an installation configuration for the light fixture in room space;

a step for determining a work space location within the room space;

a step for determining an improved location for a sensor portion at one of the plurality of locations, and once the improved location is determined;

a step for installing the sensor portion at the improved location; and a step for installing the light fixture in the room space.

In yet another alternative aspect, there is provided a light fixture device comprising elongate housing means, the housing means having a pair of opposed edge face means, a first central longitudinal region and a pair of second longitudinal regions, the first longitudinal region being centrally located therebetween, the first and second longitudinal regions extending between the two edge face means, the central first longitudinal region including at least one light emitting means, one of the second longitudinal regions including at least one sensor means, the at least one sensor means being positioned at a location which is selected relative to a work station in a room space below the light fixture device and/or relative to one or more ambient light sources near the light fixture device, the location being one of a plurality of possible locations along a substantially continuous location line extending between the two edge face means.

BRIEF DESCRIPTION OF THE DRAWINGS

Several preferred embodiments of the present invention will now be described, by way of example only, with reference to the appended drawings in which.

DESCRIPTION OF THE PREFERRED EMBODIMENTS

Figure 1:
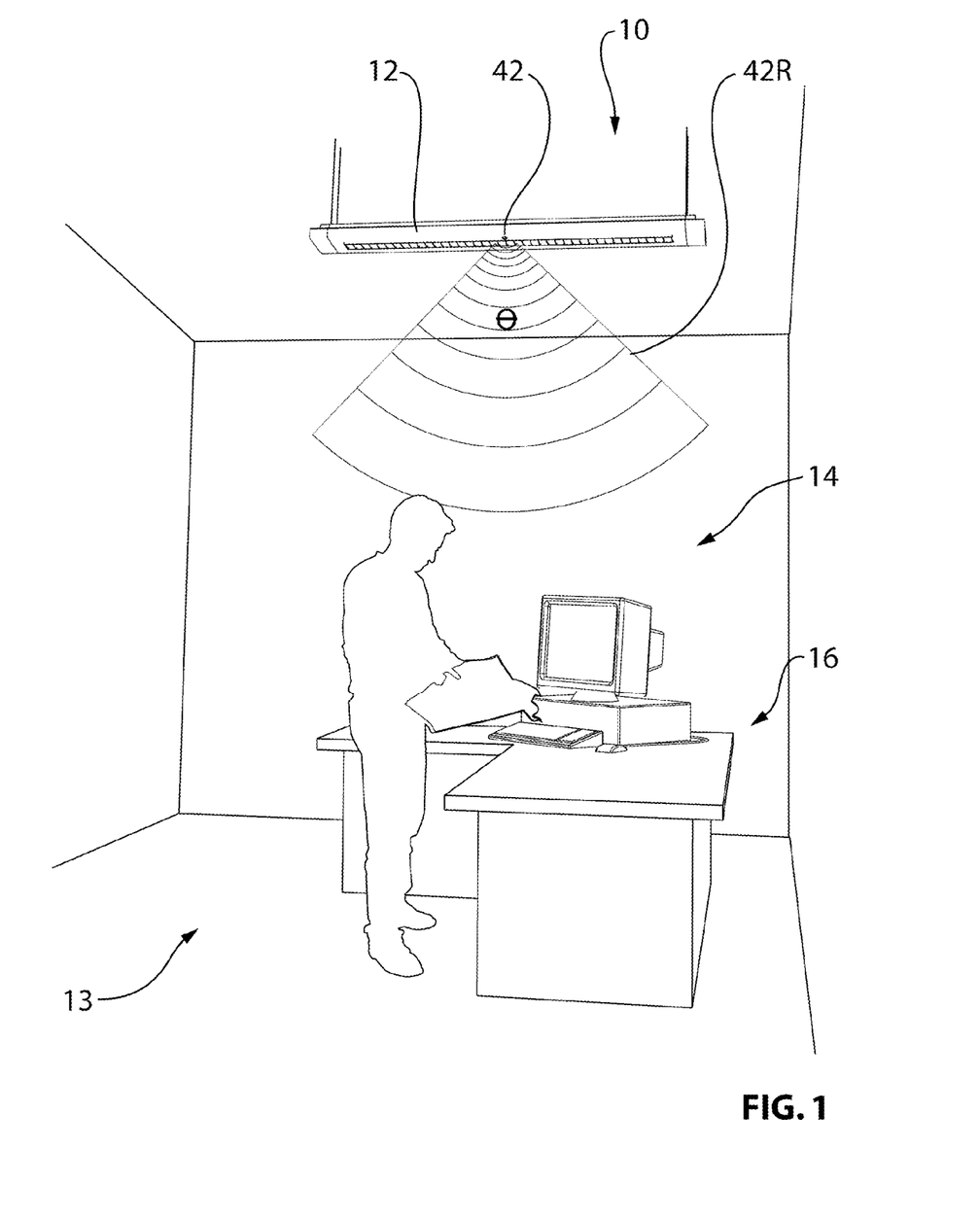
FIG. 1 is a perspective view of a light fixture installation.
Figure 2:
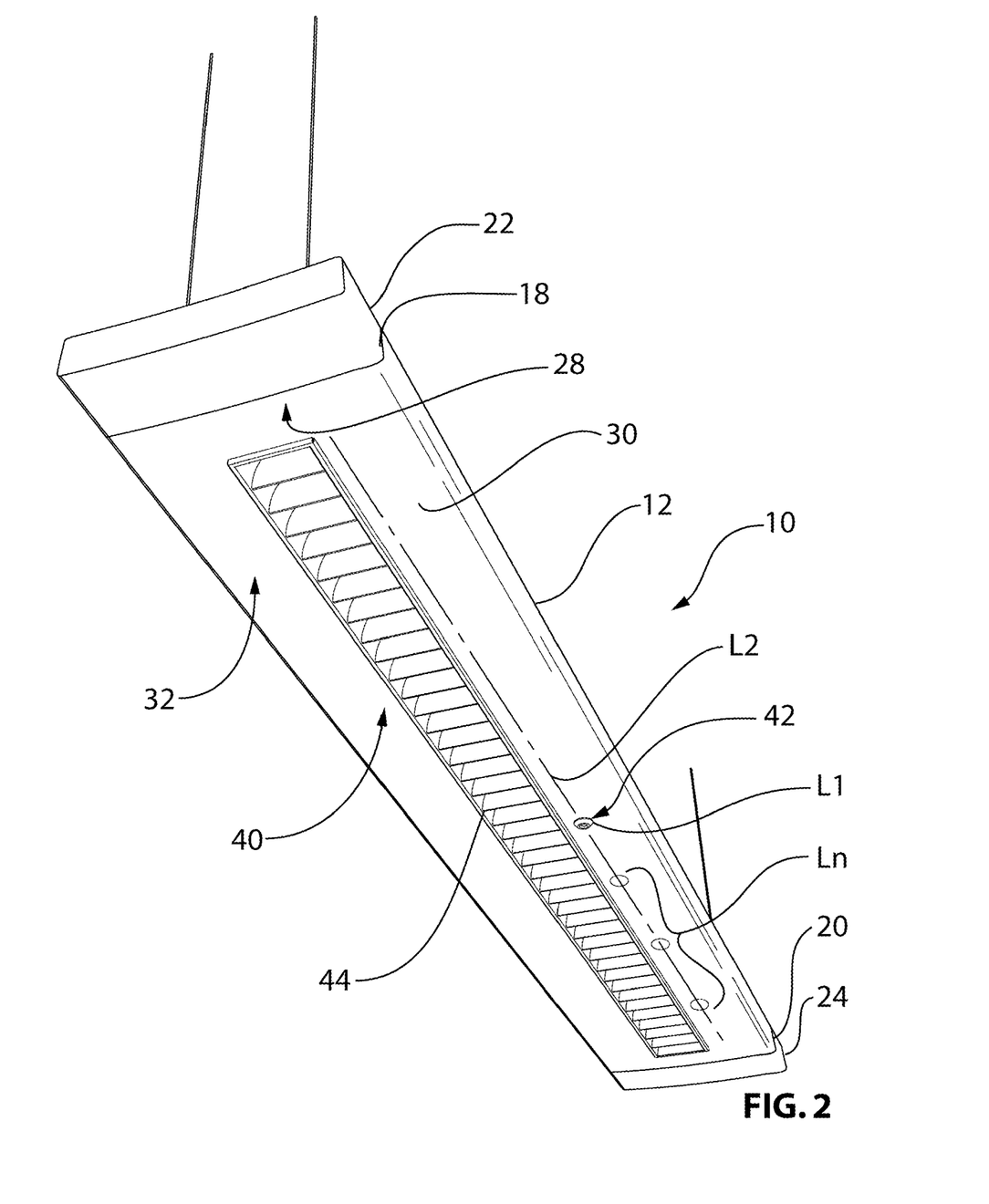
FIG. 2 is a perspective view of a light fixture device.

Referring to FIGS. 1 and 2, there is provided a light fixture 10 including an elongate housing 12. In this case, the light fixture is located above a work space 14, including a desk and/or work station 16.

The housing 12 has a pair of opposed edge faces 18, 20 and provides a central first longitudinal region 28 and two second longitudinal regions 30, 32, each on an opposite side of the central first longitudinal region 28.

Figure 4:
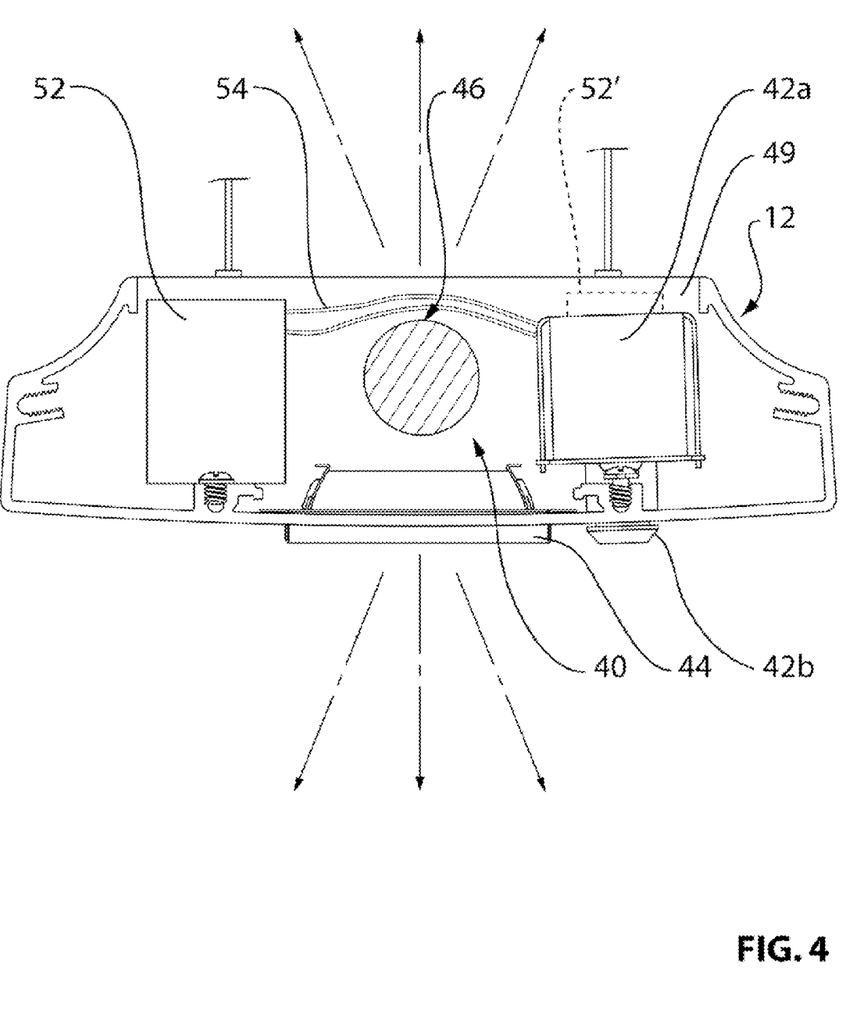
FIG. 4 is a sectional view of the device of FIG. 3.

The first and second longitudinal regions extend between the two edge faces 18, 20 and are closed by end cap portions 22, 24. The first longitudinal region 28 includes at least one light emitting portion 40 while the second longitudinal region 30 includes at least one sensor portion 42. In this example, the light emitting portion may include one or more lenses, diffusers, filters, shields and/or louvers as shown at 44, along with a light source 46 (FIG. 4), directing light (shown in chain dotted lines) through the louvers 44 and, in this case, through an upper opening 49, in the housing 12. The sensor portion 42 may include one of several possible types or functions. For instance, the sensor portion 42 may include a motion sensor or function which is operable to detect changes in the position of objects in a sensing area beyond the sensor portion 42, examples of which are available from under the trade name TRIDONIC DALI SMART EYE. Alternatively, the sensor portion 42 may include a proximity sensor or function which registers the presence of, as opposed to the movement of, an object within a predetermined distance from the sensor portion 42. Examples of proximity sensors are available under the trade name TRIDONIC DALI SMART EYE. Sensors of this type are also referred to as occupancy sensors. Still other sensors may be used to control the operation of a light fixture with changes to ambient light in the room. These, as well as other sensors may be used with the light fixture 10 as desired.

Referring to FIG. 2, the at least one sensor portion 42 is positioned at a location L1 which is optimally selected to be adjacent the work station in the room 13 below the light fixture 10. The location L1 is one of a plurality of possible locations Ln along a substantially continuous location line or path L2 extending between the two edge faces 18, 20. In this case (as shown in FIG. 1), the sensor portion 42 may be best suited to function directly above the work space 14, with a relatively wide cone-shaped sensing region 42R having an included angle "theta" of about 90 degrees. Alternatively, the sensor portion 42 may be located in other locations along the location line as will be discussed.

Figure 3:
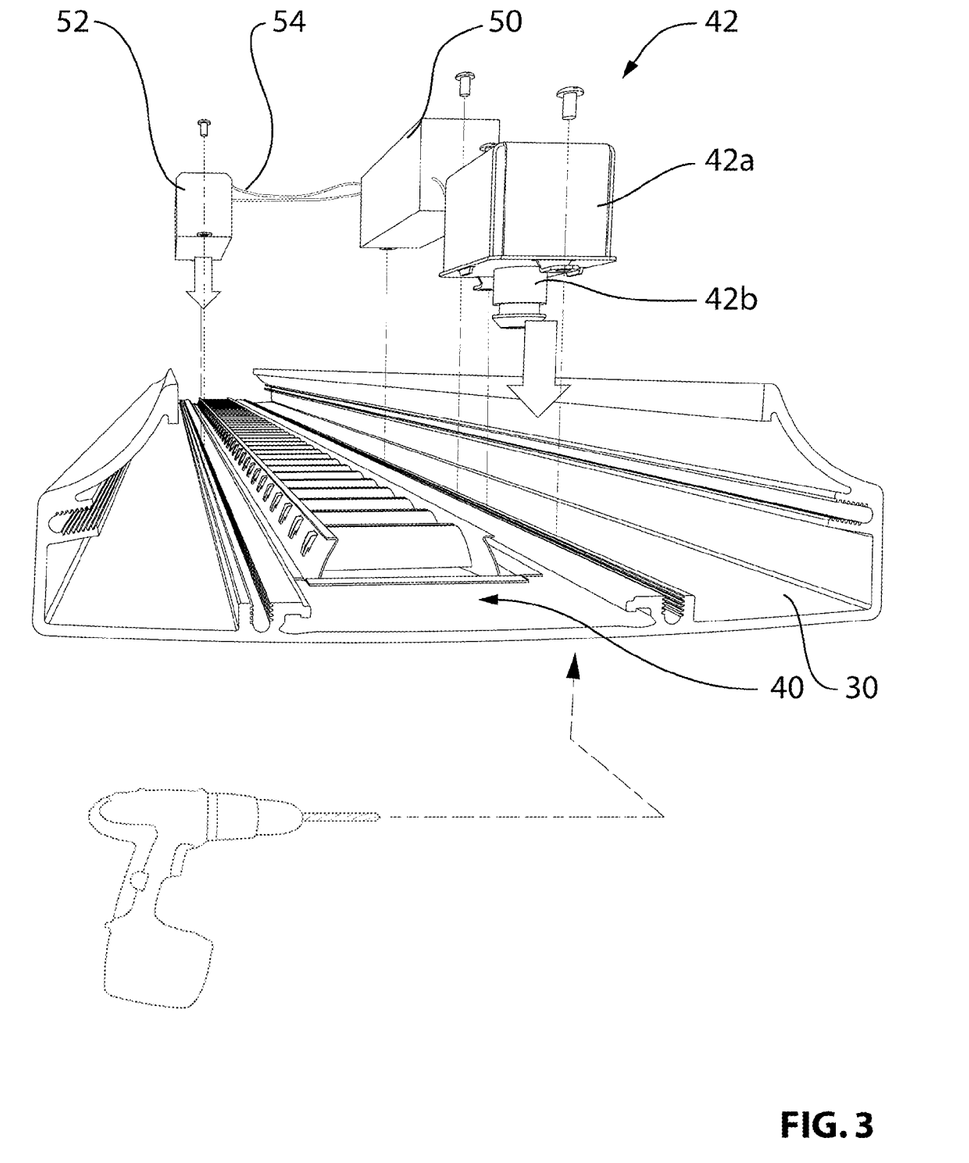
FIG. 3 is an assembly view of a portion of the device of FIG. 2.

Referring to FIG. 3, the sensor portion 42 has a housing 42a, a sensor head portion 42b extending downwardly therefrom and a sensor driver 50 to power the sensor head portion 42b, all of which are located in second longitudinal region 30. A power supply 52 and communication and power supply wiring 54 are also provided, in this case with the power supply 52 positioned in the opposite second longitudinal region 32 and, in the case of the wiring 54, extending across the central first longitudinal region. If desired, however, the power supply 52 may also be located in the second longitudinal region 30 with the sensor portion 42, as shown at 52' in dashed lines in FIG. 4. The power supply 52 may power the sensor portion 42, the light source 46 or both, as desired. Alternatively, the sensor portion 42 and/or the light source 46 may be powered by an alternative power source such as a local battery unit, not shown. Alternatively, the sensor portion 42 may be wireless and thus not require communication and/or power supply wiring to function. In this case, the sensor portion 42 may communicate over a wireless data link with switching circuitry for the light fixture 10, such as the power supply or an intermediate switch unit between the ballast and the power supply wiring, to switch the status of the light fixture 10 (say from "on" to "off" or vice versa) depending on the sensed conditions in the work space 14.

Figure 5:
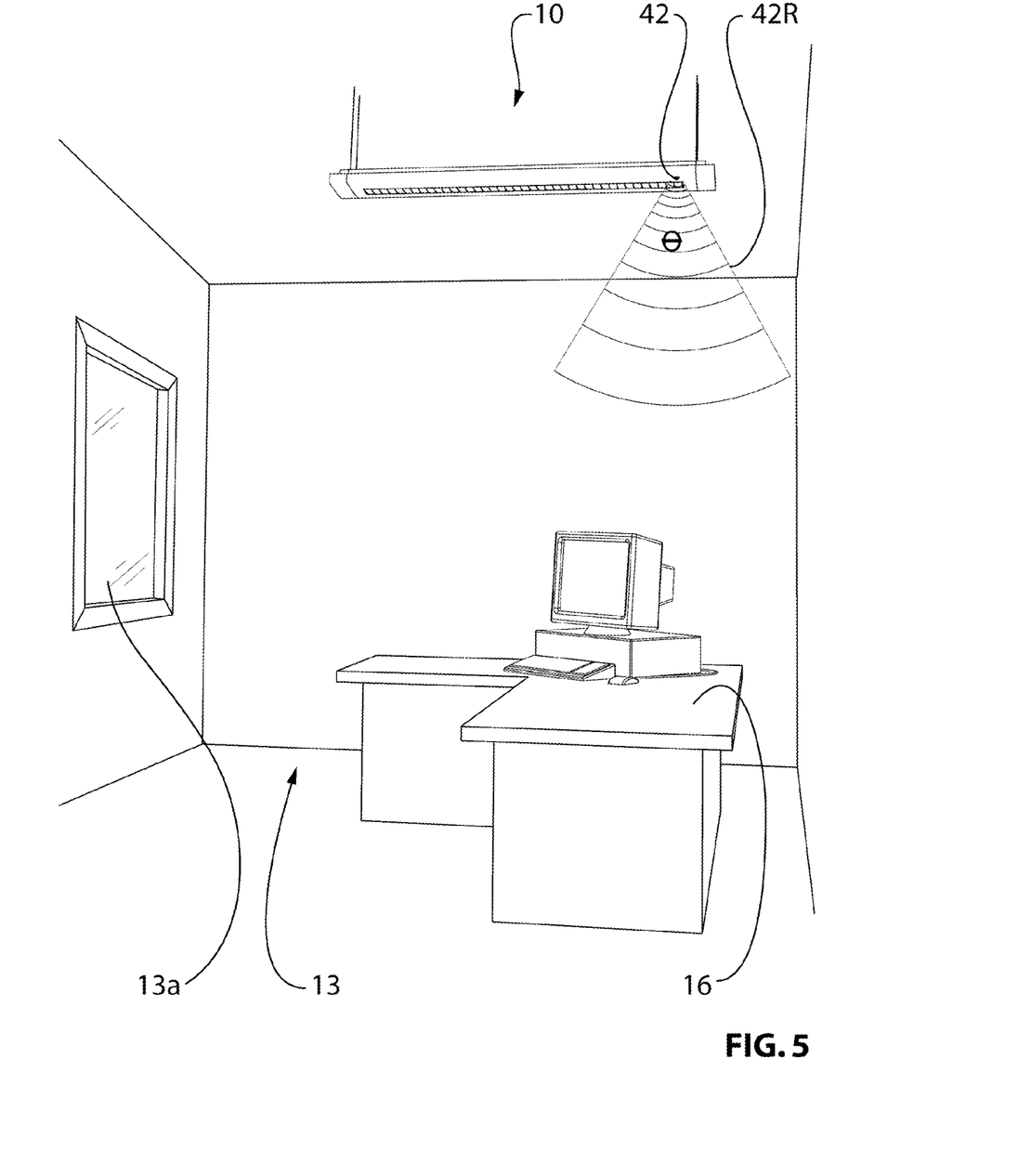
FIGS. 5 to 7 are perspective views of alternative light fixture installations.

FIG. 5 shows an alternative light fixture device 10 in which the sensor portion 42 is positioned at a location which is optimally selected relative both to the work station 16 in a room 13 below the light fixture device 10 and relative to one or more ambient light sources near the light fixture device. In this case, the sensor portion is a daylight sensor and is positioned on the location line at a location remote from the ambient light source, in this case a window 13a. The daylight sensor has a cone-shaped sensing region 42R having an included angle "theta" of about 60 degrees.

Figure 6:
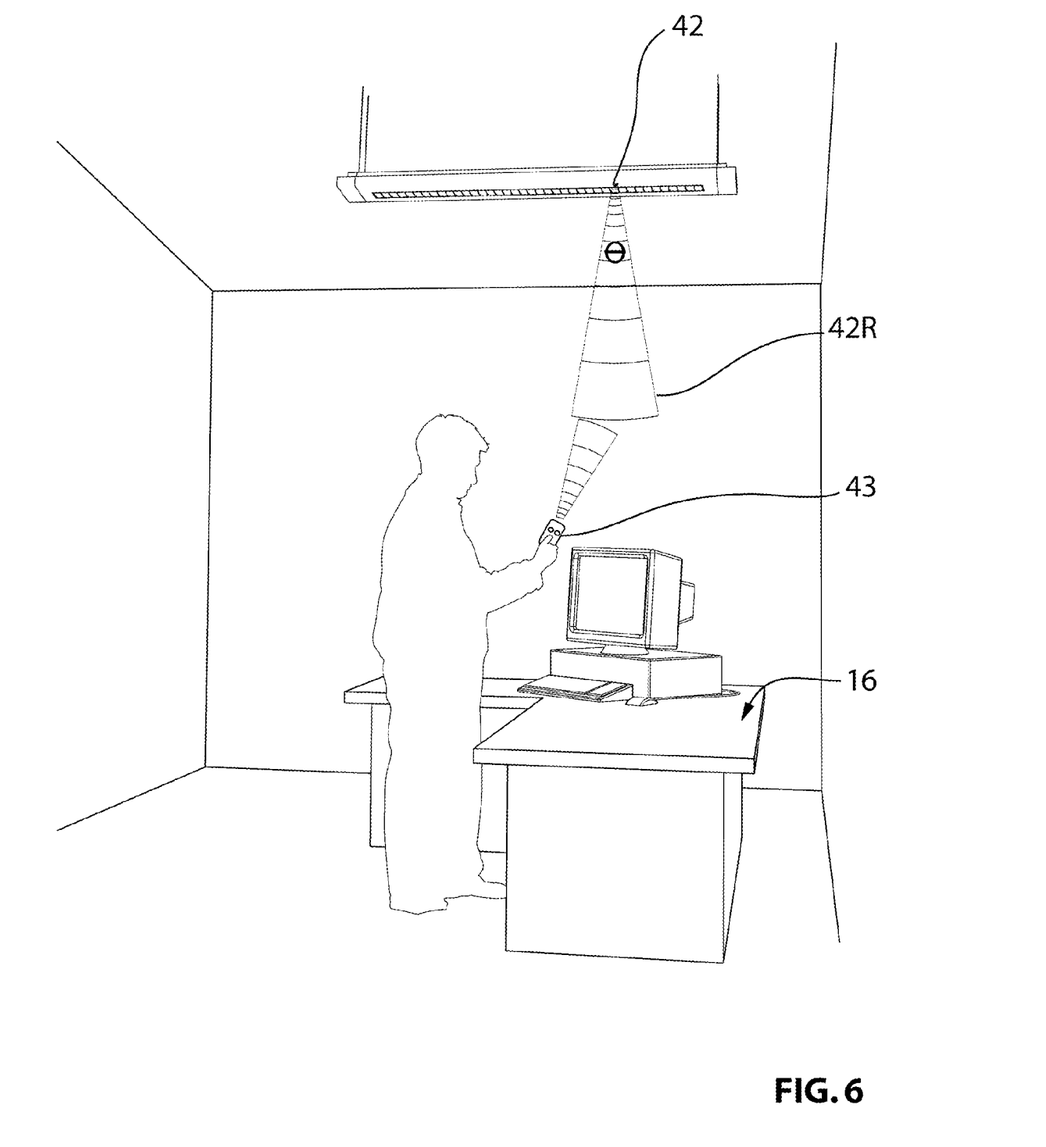

FIG. 6 shows another alternative light fixture device 10 in which the sensor portion 42 is positioned directly above the work station 16 and is provided in the form of an infrared remote control sensor with a relatively narrow cone-shaped sensing region 42R having an included angle "theta" of about 20 degrees. In this case, the sensor is positioned at a location allowing a worker at the work station 16 to be able to control the operation of the light fixture device, for example with a remote control unit as shown at 43.

Figure 7:
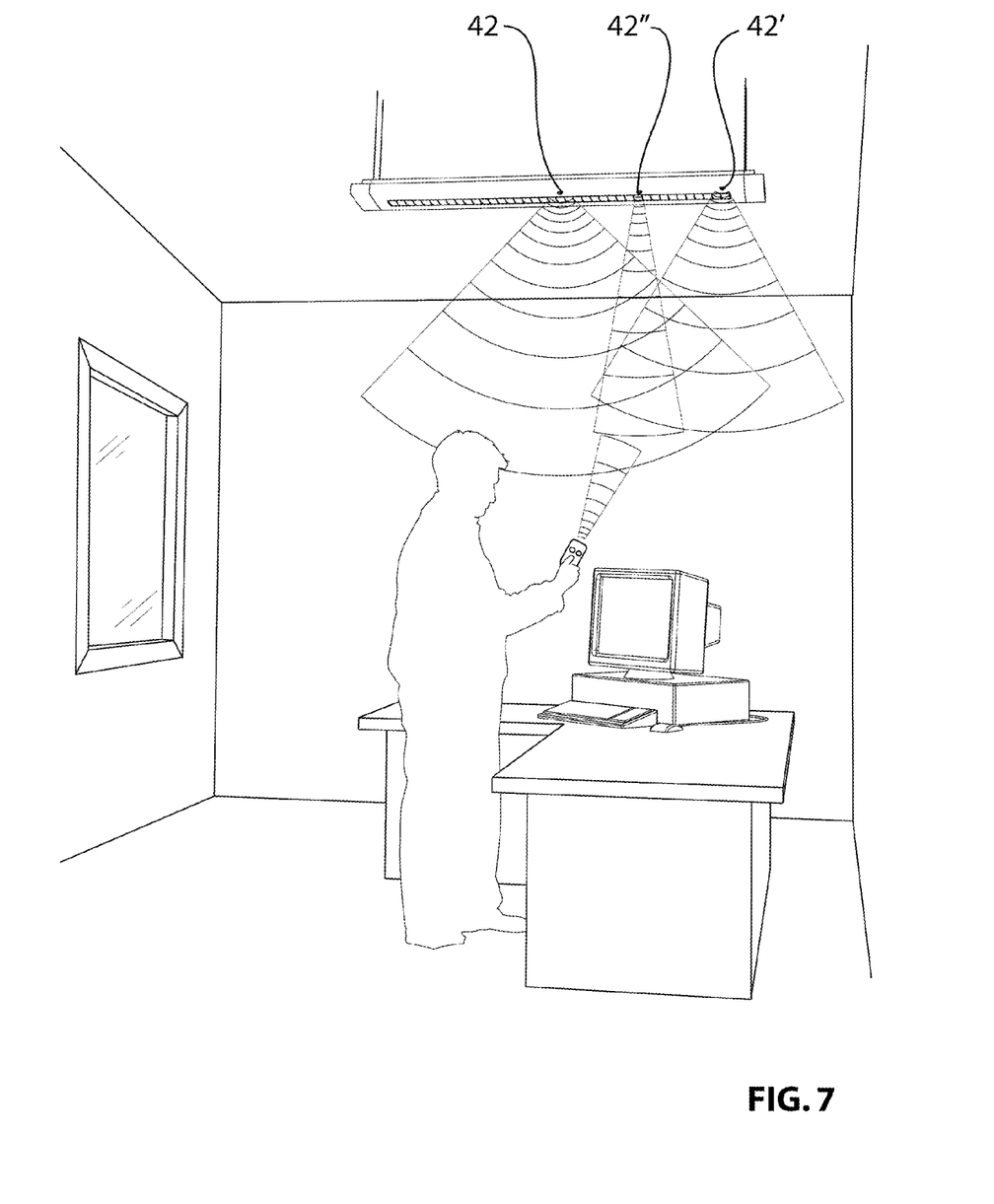

FIG. 7 shows another alternative light fixture device 10 in which a number of sensor portions (in this case three) are positioned above the work station at locations that are appropriate for their particular operation, with the occupancy sensor shown at 42, the daylight sensor shown at 42' and the remote control sensor shown at 42". Thus, the light fixture device 10 enables each sensor to be located in an optimal location for its particular function.

Figure 8:
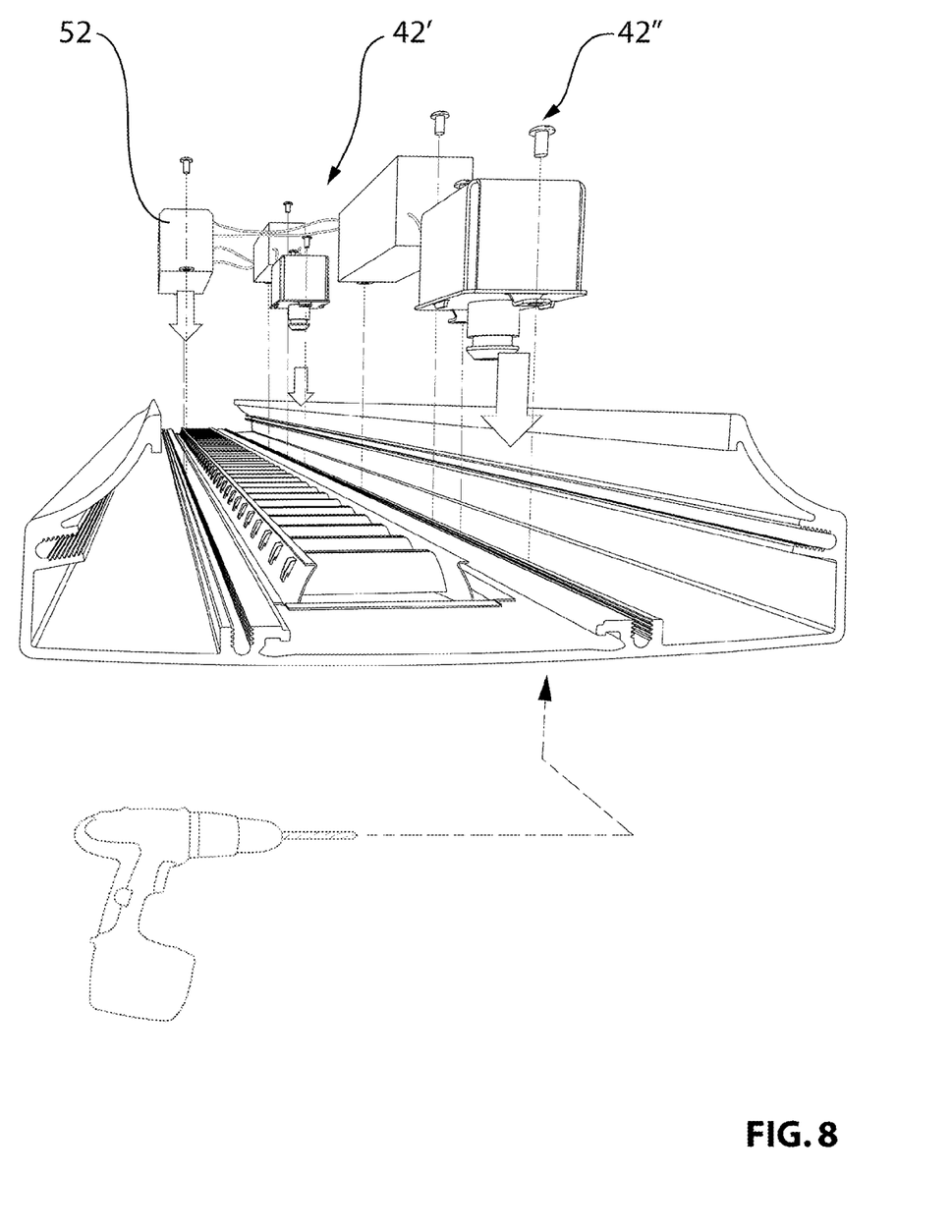
FIG. 8 is an assembly view of a portion of the device of FIG. 7.

FIG. 8 shows two of the three sensors 42', 42" which, in this example, are supplied power by a single power supply 52.

Figure 9:
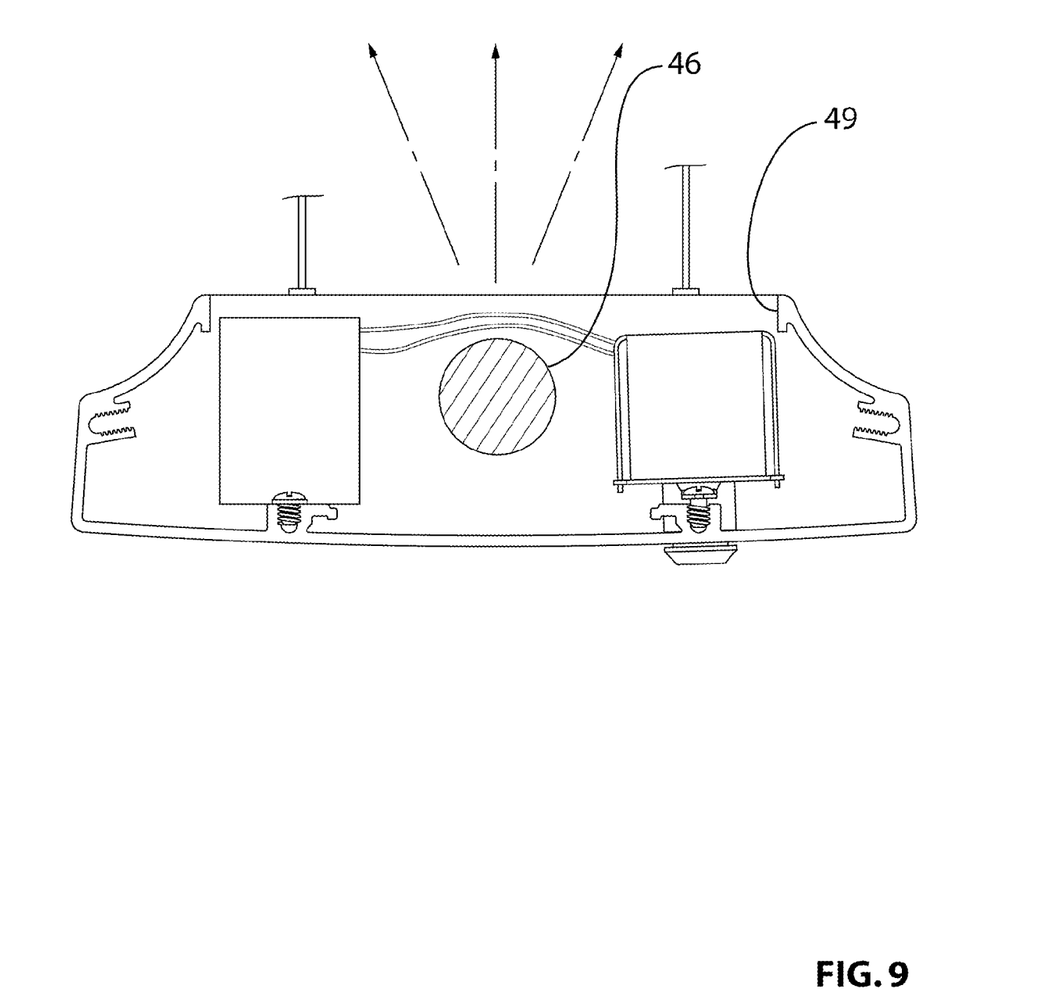
FIG. 9 is a sectional view of an alternative light fixture device.

FIG. 9 shows yet another alternative in which the light source 46 does not include a set of louvers, but rather delivers light exclusively through the upper opening 49.

Figure 10:
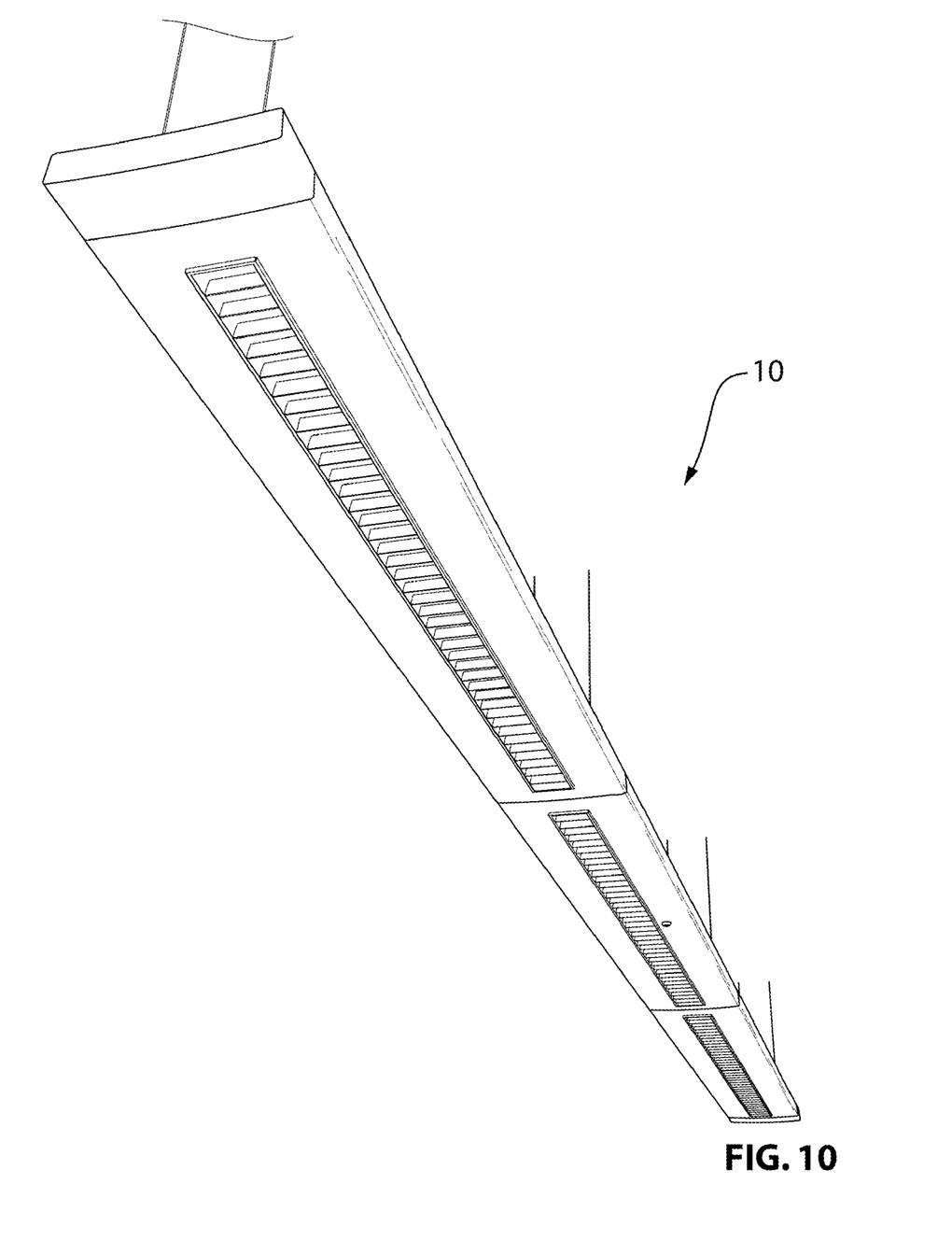
FIG. 10 is a perspective view of another alternative to the device of FIG. 2.

FIG. 10 shows still another variation with the light fixture 10 in a light fixture bank.

The light fixture 10 thus enables the location of the sensor portion 42 to be optimized according to its particular location in a room, above a work space 14 and in the location of a desk 16 in the work space 14. The light fixture 10 provides a method of optimizing the location of the sensing portion 42. The method involves providing an elongate housing 12 as defined above. At least one light emitting portion is then provided in the first longitudinal region 28. Next, the second longitudinal region 30 is arranged to provide a substantially continuous path from near one edge face to near another edge face as a plurality of possible locations for a sensor portion 42. Next, an installation configuration is determined for the light fixture 10, taking into account the room 13, the work space 14 and/or the work station, along with the presence of one or more ambient light sources, such as window 13a, is determined within the room 13. An optimal location L1 for the sensor portion 42 is then established at one or more of the plurality of locations. The sensor portion 42 is then installed by drilling or otherwise preparing a suitably dimensioned passage at the optimal location to receive the sensor head portion 42b therethrough. The sensor housing 42a is then anchored to the housing 12 and the remainder of the light fixture 10 is prepared and then installed in the room 13.

Additional sensors may thus be installed as desired, again at an optimal location according to their unique operating characteristics. In this case, the light fixtures 10 may be completely installed at a manufacturing facility and then shipped for installation, or instead, may be partially manufactured and/or partially assembled, with subsequent manufacture/assembly steps performed at the installation site. For instance, the housing may be provided with a number of predetermined punch-outs or the like providing for a relatively easy mode to form the passage in the housing at location L1 to receive the sensing head portion 42b. While the examples above are shown with the housing above the work station, there may be examples where the housing need not be above the work station but may be spaced therefrom. This may be the case, where sensors are employed which utilize gimble mount arrangements, which permit the angle of attack of the sensor to be adjusted away from a strictly vertical orientation.

The housing 12 is shown in the illustrations above as a one piece extruded member. However, it may be provided in a number of other forms. It may be formed by pressing a metal or other blank, or by moulding.

The housing may be formed from a number of separately formed components welded or otherwise bonded or attached together. Thus, in one example, the housing provides a central light emitting panel region and a pair of laterally offset side panel regions to receive the sensor portions and the power supplies or ballasts.

While the light fixture is described with respect to a single sensor portion, more than one sensor portion may be provided, including two or more sensor portions, in which one sensor portion drives the operation of one local light fixture and another drives the operation of another local light fixture. The location line or path need not, in all cases, be substantially continuous from near one edge face to near another edge face. There may be instances, for example, where minor obstacles or discontinuities are present along the path that may inhibit the location of the sensor portion. However, there may be arranged so that the path is substantially continuous and/or available in the regions above the work space where the relevant sensor's operation may be optimized or otherwise improved.

While the present invention has been described for what are presently considered the preferred embodiments, the invention is not so limited. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

The invention claimed is:

1. A light fixture device comprising an elongate housing, the housing having a pair of opposed edge faces, a first central longitudinal region and a pair of second longitudinal regions, the first longitudinal region being centrally located therebetween, the first and second longitudinal regions extending between the two edge faces, the central first longitudinal region including at least one light emitting portion, one of the second longitudinal regions including at least one sensor, the at least one sensor being positioned at a location which is optimally selected relative to a work station in a room space below the light fixture device and/or relative to one or more ambient light sources near the light fixture device, the location being one of a plurality of possible locations along a substantially continuous location line extending between the two edge faces;

said substantially continuous location line being at least one channel bordering said light emitting portion, said channel receiving a fastener through said sensor and into said substantially continuous location line channel to position said sensor in one of a plurality of positions on said substantially continuous location line.

2. A device as defined in claim 1, further comprising a power supply positioned in one of the second longitudinal regions.

3. A device as defined in claim 1, further comprising a power supply, the power supply and the sensor being positioned in opposite second longitudinal regions.

4. A device as defined in claim 1, further comprising a power supply and communication and power supply wiring positioned in one of the second longitudinal regions, the sensor being positioned in the other of the second longitudinal regions.

5. A device as defined in claim 1, further comprising a power supply and communication and power supply wiring positioned adjacent the at least one sensor in one of the second longitudinal regions.

6. A device as defined in claim 1, the housing having a lower surface, the light emitting portion including one or more lenses, diffusers, filters, a shields and/or louvers located adjacent to or in the lower surface.

7. A device as defined in claim 1, the housing having a lower portion and an upper portion, the upper portion including one or more openings, the light emitting portion including a light source for emitting light through one or more of the openings.

8. A device as defined in claim 1, further comprising a power supply and communication and power supply wiring positioned in one of the second longitudinal regions, the at least one sensor including a pair of sensor portions being positioned in another of the second longitudinal regions.

9. A device as defined in claim 1, wherein the at least one sensor includes a daylight sensor, an occupancy sensor and/or an infrared remote control sensor.

10. A device as defined in claim 1, further comprising a power supply and communication and power supply wiring positioned in one of the second longitudinal regions, the at least one sensor including a pair of sensors being positioned in another of the second longitudinal regions, mounting means for mounting the housing in the room space, one of the sensors including a daylight sensor which is at a location on said substantially continuous location line channel which is to be distal relative to an ambient light source in the room space, an occupancy sensor which is at a location on said substantially continuous the location line channel which is to be above the work station, and/or a remote control sensor which is at a location on said substantially continuous location line channel to be above the work station.

11. A light fixture comprising a housing assembly, the housing assembly having a pair of opposed edge faces and two or more inline elongate housing portions extending therebetween, the two or more housing portions collectively providing a first set of two or more inline first longitudinal regions, the first set being located between two sets of two or more inline second longitudinal regions, the first inline longitudinal regions and second inline longitudinal regions extending between the two edge faces, the first inline longitudinal regions including at least one light emitting portion bounded by a first and a second substantially continuous location line positioned on opposing sides of said at least one light emitting portion, said first and said second substantially continuous location line being a fastener channel designed for removably receiving fasteners extending through a separable housing and into one of said location lines, the second inline longitudinal regions including at least one sensor housing removably fastened in one of said first or second substantially continuous location lines, the at least one sensor housing being positioned at a location which is optimally selected relative to a work station in a room space below the light fixture and/or relative to one or more ambient light sources near the light fixture , the location being one of a plurality of possible locations along said substantially continuous location line extending between the two edge faces, and a pair of end cap units joined to the inline elongate housing portions.

12. A light fixture comprising:
a first end and a second end on opposed ends of a fixture on a fixture housing;
a central light emitting region extending substantially between said first and said second end;
at least one lamp positioned above said central light emitting region;
a first and a second substantially continuous fastener channels bordering said central light emitting region, said first and second substantially continuous fastener channels positioned on opposite sides of said central light emitting region below said lamp, each of said first and said second substantially continuous fastener channels being a U-shaped channel operable to receive a fastener;
a sensor housing mountable within said fixture housing and receiving a fastener, said fastener of said sensor housing mounting said sensor housing to at least one of said first and said second substantially continuous fastener channels;
wherein said sensor housing further has a light sensor portion extending through said housing along said at least one of said first or said second substantially continuous fastener channels;
wherein said sensor housing is positionable in one of a plurality of positions anywhere along said at least one of said first and said second substantially continuous fastener channel.

* * * * *